United States Patent
Wu et al.

(10) Patent No.: US 7,385,977 B2
(45) Date of Patent: *Jun. 10, 2008

(54) MULTICAST SYSTEM FOR FORWARDING DESIRED MULTICAST PACKETS IN A COMPUTER NETWORK

(75) Inventors: Ishan Wu, Cupertino, CA (US); Nagarani Chandika, Sunnyvale, CA (US); Ramana Mellacheruva, San Jose, CA (US); Yiqun Cai, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 669 days.

This patent is subject to a terminal disclaimer.

(21) Appl. No.: 10/939,100

(22) Filed: Sep. 10, 2004

(65) Prior Publication Data

US 2005/0157741 A1    Jul. 21, 2005

Related U.S. Application Data

(63) Continuation of application No. 09/688,895, filed on Oct. 16, 2000, now Pat. No. 6,847,638.

(51) Int. Cl.
*H04L 12/28* (2006.01)
(52) U.S. Cl. ................... 370/389; 370/469
(58) Field of Classification Search ........ 370/389–395, 370/432, 469
See application file for complete search history.

(56) References Cited

U.S. PATENT DOCUMENTS

| | | | |
|---|---|---|---|
| 5,917,820 A | 6/1999 | Rekhter | |
| 5,959,989 A | 9/1999 | Gleeson | |
| 6,055,364 A | 4/2000 | Speakman et al. | |
| 6,078,590 A | 6/2000 | Farinacci et al. | |
| 6,147,993 A | 11/2000 | Kloth et al. | |
| 6,182,147 B1 | 1/2001 | Farinacci | |
| 6,212,182 B1 | 4/2001 | McKeown | |
| 6,262,988 B1 | 7/2001 | Vig | |

(Continued)

OTHER PUBLICATIONS

Wanjiun Liao et al, Receiver-Initiated Group Membership Protocol (RGMP) : A New Group Management Protocol for IP Multicasting, Oct. 31-Nov. 3, 1999, Network Protocols (ICNP '99) Proceedings, Seventh Conference, pp. 51-58.

(Continued)

*Primary Examiner*—Chi Pham
*Assistant Examiner*—Phuc Tran
(74) *Attorney, Agent, or Firm*—Cesari and McKenna LLP

(57) ABSTRACT

A method and apparatus for a downstream router to inform an upstream router by use of packets of a new router command protocol that the upstream router is to forward multicast packets of a specified group to the downstream router. First the downstream router transmits a HELLO packet to upstream router to inform the upstream router that the downstream router is a multicast router implementing the invention. Then, in the event that the downstream router receives a packet from an end station requesting multicast packets of a particular group, in response the downstream router sends a JOIN packet to the upstream router. The JOIN packet requests that the upstream router forward the requested group multicast packets to the downstream router. When a multicast group packet arrives at the upstream router, the upstream router forwards the packet to those downstream routers requesting that group.

35 Claims, 15 Drawing Sheets

U.S. PATENT DOCUMENTS 6,370,142 B1    4/2002   Pitcher et al.
6,469,987 B1    10/2002  Rijhsinghani
6,847,638 B1 *  1/2005   Wu et al. .................. 370/389

OTHER PUBLICATIONS

Won-Tae Kim et al., Scalable QoS-based IP Multicast Over Label Switching Wireless ATM Networks, Sep.-Oct. 2000, IEEE, vol. 14, Issue 5, pp. 26-31.

F. Ansari et al., IP Switching Over Fast ATM Cell Transport (IPSOFACTO) : IP Multicast Over Wireless ATM, Oct. 5-9, 1998, IEEE ICUPC '98, vol. 1, pp. 621-626.

S. Deering, Host Extensions for IP Multicasting, Request for Comments 1112, Netwrok Working Group, Internet Engineering Task Force, 1989, pp. 1-17.

D. Estrin et al., Protocol Independent Multicast-Sparse Mode (PIM-SIM) : Protocol Specification, Request for Comments 2117, Network Working Group, Internet Engineering Task Force, 1997, pp. 1-66.

W. Fenner, Internet Group Management Protocol, Version 2, Request for Comments 2236, Network Working Group, Internet Engineering Task Force, 1997, pp. 1-24.

D. Estrin et al., Protocol Independent Multicast-Sparse Mode (PIM-SIM) : Protocol Specification, Request for Comments 2362, Network Working Group, Internet Engineering Task Force, 1998, pp. 1-66.

* cited by examiner

INTERNET BACKBONE
INTERCONNECT

RGMP PACKET TYPE

| VALUE | DESCRIPTION | ACTION |
|---|---|---|
| 0xFF | HELLO | NO MULTICAST DATA TRAFFIC IS SENT TO THE ROUTER BY THE SWITCH. SENT OUT WHEN RGMP FEATURE IS ENABLED ON THE ROUTER. THESE PACKETS HAVE "0.0.0.0" IN THE GROUP ADDRESS FIELD OF THE RGMP PACKET. THESE HELLOS ARE SENT PERIODICALLY. |
| 0xFE | BYE | ALL MULTICAST DATA TRAFFIC WILL BE SENT TO THE ROUTER BY THE SWITCH. SENT OUT WHEN RGMP FEATURE IS DISABLED ON THE ROUTER. THESE PACKETS HAVE "0.0.0.0" IN THE GROUP ADDRESS FIELD OF THE RGMP PACKET. RGMP BYE MESSAGES ARE NOT SENT PERIODICALLY. |
| 0xFD | JOIN (FOR A GROUP G) | MULTICAST DATA TRAFFIC FOR THE MULTICAST MAC ADDRESS THAT CAN BE DERIVED FROM THE L3 GROUP ADDRESS "G" ARE SENT TO THE ROUTER. THESE PACKETS HAVE GROUP "G" IN THE GROUP ADDRESS FIELD OF THE RGMP PACKET. |
| 0xFC | LEAVE (FOR A GROUP G) | MULTICAST DATA TRAFFIC FOR THE GROUP G WILL NOT BE SENT TO THE ROUTER. THESE PACKETS HAVE GROUP "G" IN THE GROUP ADDRESS FIELD OF THE RGMP PACKET. |

FIG. 7

ADDRESSES USED IN RGMP PACKETS

| TYPE OF ADDRESS | ADDRESS USED (HEX) | |
|---|---|---|
| DESTINATION MAC ADDRESS IN ALL RGMP PACKETS | 01-00-5e-00-00-19 | —802 |
| DESTINATION IP ADDRESS IN ALL RGMP PACKETS | 224.0.0.25 | —804 |
| GROUP ADDRESS FIELD IN RGMP HELLO AND BYE MESSAGES | 0.0.0.0 | —806 |
| GROUP ADDRESS FIELD IN RGMP JOIN AND LEAVE MESSAGES | MULTICAST GROUP ADDRESS FOR WHICH RGMP JOIN/LEAVE IS BEING SENT | —808 |

MULTICAST SYSTEM FOR FORWARDING DESIRED MULTICAST PACKETS IN A COMPUTER NETWORK

RELATED CASES

This Application for United States Patent is a continuation of U.S. patent application Ser. No. 09/688,895 filed on Oct. 16, 2000, now issued as U.S. Patent No. 6,847,638 on Jan. 25, 2005.

BACKGROUND OF THE INVENTION

1. Field of the Invention

This invention relates to multicast groups in a computer network, and more particularly to transmission of multicast groups from a router through a layer 2 switch to another router, which then distributes the packets to further downstream routers or to end stations.

2. Background Information

A network exchange point is often designed with a Layer 2 switch interconnecting a plurality of fast routers. The Layer 2 switch has a plurality of ports, and usually one router is connected to one port of the Layer 2 switch. Also, an end station may be directly connected to the Layer 2 switch.

An end node is spoken of as "desiring" to receive multicast packets of a particular multicast group, for example, in response to a user (person) executing a command to begin receiving the multicast group packets. An end node desiring to receive multicast group packets sends a relatively simple packet, referred to as an Internet Group Management Packet (IGMP) packet, to the first upstream router in order to execute a relatively simple multicast group join procedure. A router, in response to receiving an IGMP join packet, sends a Protocol Independent Multicast (PIM) join packet to other routers in order to execute a relatively complex multicast join procedure referred to as a "PIM join". The PIM join packet informs other routers that the new router requests multicast group traffic from a particular group. The IGMP protocol is described in RFC 1112 and RFC 2236, and the PIM protocol is described in RFC 2117 and RFC 2362, where an RFC is a Request for Comments published by the Internet Engineering Task Force, and all disclosures of these RFCs are incorporated herein by reference. A copy of an RFC may be downloaded from the IETF Web Site located at URL www.ietf.org.

In the event that a layer 2 switch interconnects the routers, a PIM join packet transmitted by a router and reaching the layer 2 switch is forwarded to each of the ports of the layer 2 switch connected to a multicast router. The PIM join packet is then ordinarily transmitted by the port to the multicast router. Routers receiving the PIM join packet respond in accordance with the PIM protocol to set up the multicast group distribution tree. A layer 2 switch forwards all multicast packets to all ports connected to a router, except it does not forward the multicast packet through the port from which the multicast packet arrived.

Multicast data traffic may arrive at the Layer 2 switch from any one of the multicast routers connected to it. The Layer 2 switch then transmits all multicast data packets through each port connected to a multicast router. That is, the Layer 2 switch does not discriminate between different multicast groups and the routers which need to receive packets of a particular group. The Layer 2 switch simply transmits all multicast group packets to all multicast routers by transmitting multicast packets through the ports connected to the multicast routers.

Accordingly, each of the routers receives multicast group packets which it does not need. This redundant traffic is unwanted.

In the event that an end station is connected to a layer 2 switch, the IGMP packet which the end station sends to a router passes through the layer 2 switch. The layer 2 switch, if enabled, may use "IGMP snooping" to examine the contents of an IGMP packet. In examining the contents of an IGMP packet, the layer 2 switch reads the group address, and in response, forwards only multicast traffic of the group requested to the end station.

There is needed a method to have a Layer 2 switch transmit multicast group traffic to only those routers which need packets of a particular multicast group.

SUMMARY OF THE INVENTION

The invention gets rid of the unnecessary multicast group traffic forwarded to multicast routers by a layer 2 switch, by configuring the Layer 2 switch forwarding table to list only the routers which need packets of a particular group.

The invention is a method of a router informing a Layer 2 switch by use of packets of a new router port group management protocol (RGMP) that the layer 2 switch is to forward multicast packets of a specified group to the router. First the router transmits a RGMP HELLO packet to the layer 2 switch to inform the switch that the router is a multicast router implementing the invention. Then, in the event that the router receives an IGMP packet from an end station requesting multicast packets of a particular group, in response the router sends an RGMP JOIN packet to the layer 2 switch. The RGMP JOIN packet requests that the layer 2 switch forward only multicast group packets, of the group whose group number is written into a field of the RGMP JOIN packet, to the router. Also, the router sends a prior art PIM JOIN packet to other multicast routers in order to be placed on the multicast distribution tree for that group.

In response to receiving the RGMP JOIN packet, the Layer 2 switch creates an entry in its Forwarding Table. Then when a data packet arrives with a multicast group address, the Layer 2 switch interprets the group address, and looks in the forwarding table for that group address. Corresponding to that group address in the forwarding table, the Layer 2 switch finds a list of only those routers which have sent a RGMP JOIN packet to the Layer 2 switch for that particular group. The layer 2 switch, in response to the entries in its forwarding table, then forwards to a router, those multicast packets of the groups requested by the router.

The RGMP join packet is identical in format to the prior art IGMP join packet, but has a different "type" number in the "type" field. This choice of format makes implementation in layer 2 switches easier because a layer 2 switch implementing "IGMP snooping" already has the capability to interpret an IGMP packet. The router is configured by a person such as a "router administrator" to "know" that a Layer 2 switch is RGMP capable.

A multicast router may transmit a RGMP LEAVE message to a layer 2 switch in order to terminate transmission of multicast packets of a particular group G by the layer 2 switch to the multicast router.

A multicast router may transmit a RGMP BYE message to a layer 2 switch in order to terminate the RGMP protocol between the router and the layer 2 switch, in which event the layer 2 switch then transmits all multicast traffic to the router as though the router were a legacy multicast router not implementing the invention.

BRIEF DESCRIPTION OF THE DRAWINGS

Turning now to the drawings, in which like numerals represent like parts in the several views:

FIG. 7 is a table giving RGMP packet types.

FIG. 8 is a table giving addresses used in RGMP packets.

DETAILED DESCRIPTION OF AN
ILLUSTRATIVE EMBODIMENT

Figure 1:
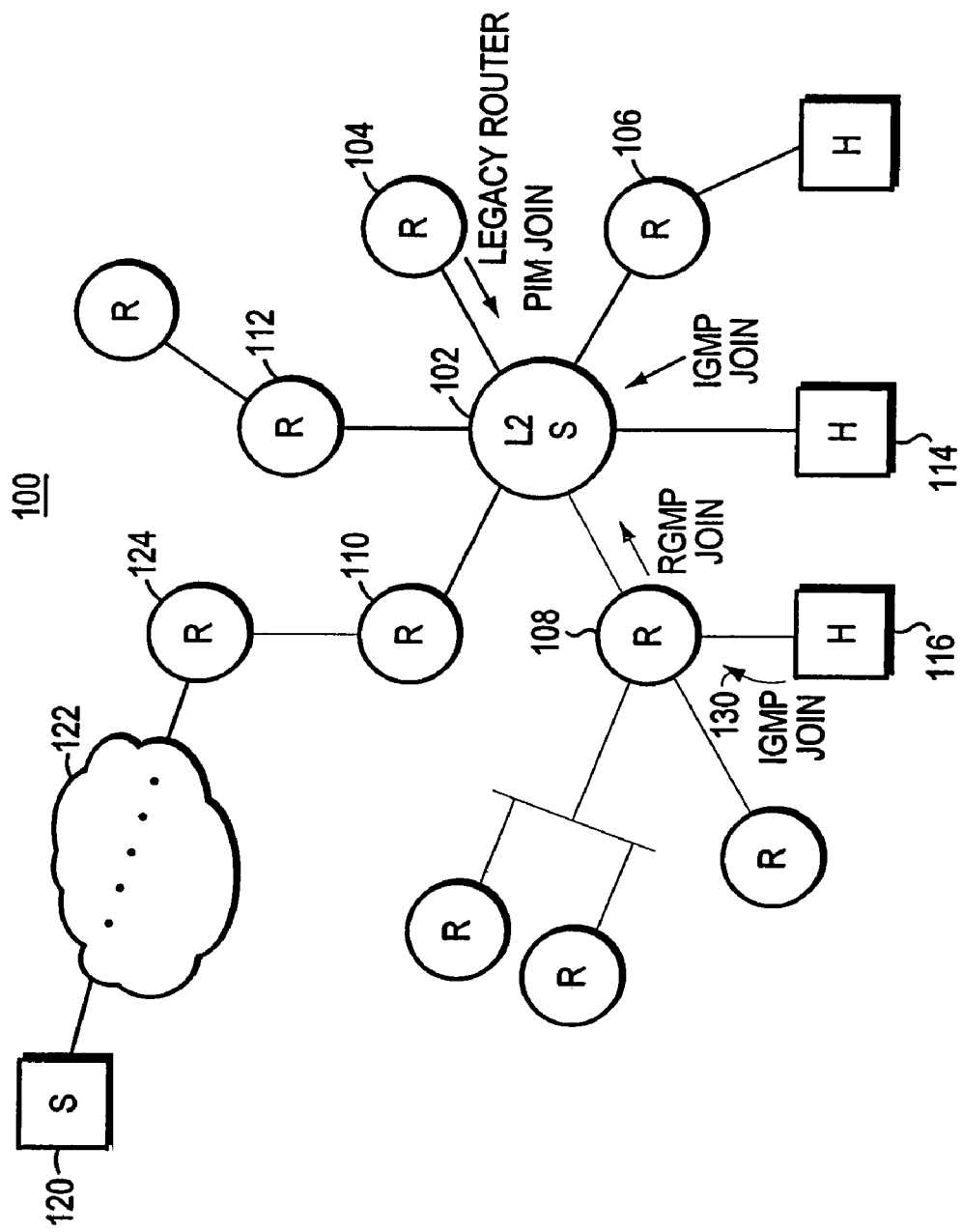
FIG. 1 is a block diagram of a computer network in accordance with the invention.

Computer network 100 is shown in FIG. 1. Computer network 100 has a Layer 2 switch 102 which switches packets using Layer 2 protocol.

Various ports of switch 102 are connected to routers. For example, Layer 2 switch 102 connects to legacy router 104. Legacy router 104 does not implement the invention, as will be explained in greater detail herein below.

Also connected to Layer 2 switch 102 are routers which implement the invention, including router 106, router 108, router 110, and router 112. Also, a host computer 114 is shown connected to a port of Layer 2 switch 102.

Figure 14:
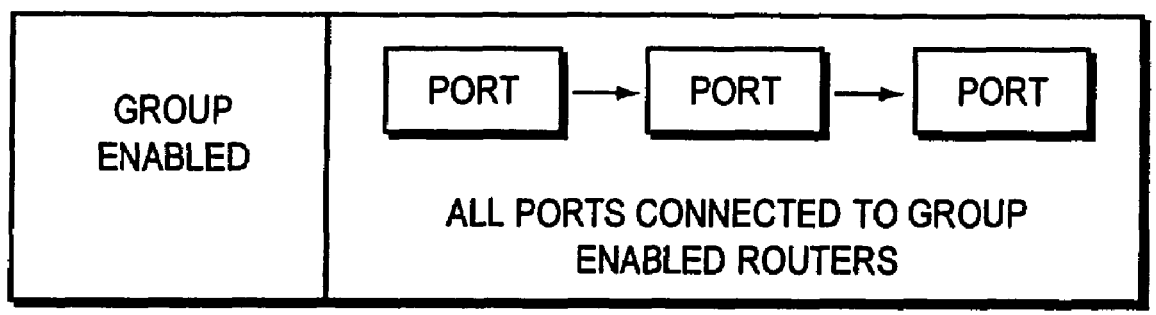
FIG. 14 is a multicast forwarding table showing entries in a prior art Layer 2 switch not implementing the invention.

Source computer end station 120 transmits packets belonging to a multicast group. The multicast group packets are transported, for example, through network cloud 122, to router 124. Router 124 in turn connects to router 110, and router 110, connects to a port of Layer 2, switch 102. The multicast packets transmitted by source end station 120 contain a multicast destination address in their Layer 2 address, that is the MAC destination address. Layer 2, switch 102 recognizes the multicast address in the Layer 2 destination address field of the multicast packet, and transmits that packet to all multicast enabled routers connected to Layer 2, switch 102, in accordance with the prior art, and as shown in FIG. 14.

In accordance with the invention, Layer 2 switch 102 contains a forwarding table keyed to the group address carried in the multicast packet, where the forwarding table is for forwarding multicast group packets through ports connected to routers implementing the invention, as described further hereinbelow. The Layer 2 switch 102 reads the group address, in response to discovering a multicast address in the Layer 2 destination address field, and does a table look-up based on the group address, and finds in its forwarding table a list of ports to which the multicast group packet should be transmitted. Accordingly Layer 2, switch 102 transmits only those multicast group packets to a multicast enabled router, where that particular router has downstream receiving host computers desiring to receive packets from that particular group of multicast packets.

Figure 2:
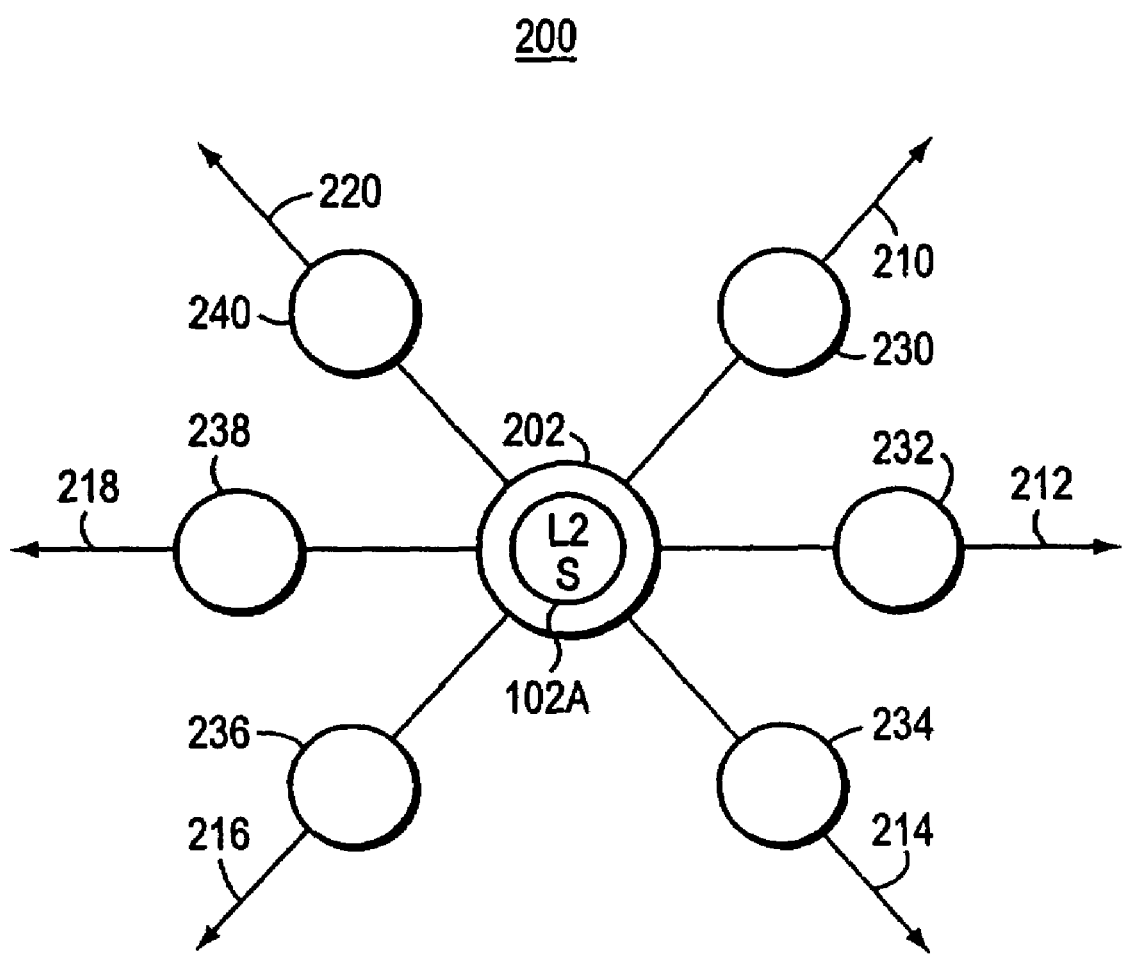
FIG. 2 is a block diagram of an Internet backbone interconnect.

Turning now to FIG. 2 computer network 200 is shown. Computer network 200 has a plurality of Internet backbone routers interconnected at a hub 202. Internet backbone routers connected through hub 202 include network 210 connected through backbone router 230, network 212 connected through backbone router 232, network 214 connected through backbone router 234, network 216 connected through backbone router 236, network 218 connected through backbone router 238, and network 220 connected through backbone router 240, etc. For example, each of the Internet backbone routers interconnected through hub 202 may have giga-bit per second bandwidth. A Layer 2 switch such as Layer 2 switch 102A performs the interconnect switching for interconnect hub 202.

A commonly used topology for an Internet backbone hub is shown in network 200. Terminology is introduced describing routers as "downstream" from a port of hub 202, or more particularly downstream from a Layer 2 switch 102A performing the switching for hub 202.

The first down stream router, for example, in network 210 is backbone router 230. The first down stream router in network 212 is backbone router 232. The first down stream router in network 214 is backbone router 234. The first down stream router for network 216 is backbone router 236. The first down stream router for in network 218 is backbone router 238. The first down stream router for in network 220 is backbone router 240, etc.

Network 100 of FIG. 1 may, for example, also represent an Internet backbone interconnection hub. The point to note is that a number of backbone routers are downstream from ports of the Layer 2 switch, and the layer 2 switch performs the switching for the hub.

A Layer 2 switch, in the prior art, forwards all multicast packets for all groups to all downstream routers which are enabled as multicast routers. In a busy Internet backbone interconnect hub 202 the various down stream routers are overloaded when all multicast packets are forwarded for all groups to every down stream router enabled for multicast. It is much more desirable to have the Layer 2 interconnect switch 102A in the interconnect hub 202 forward only packets belonging to a selected group to a router, where the router has a need to further route the packets of that selected group to further downstream end stations.

Figure 3:
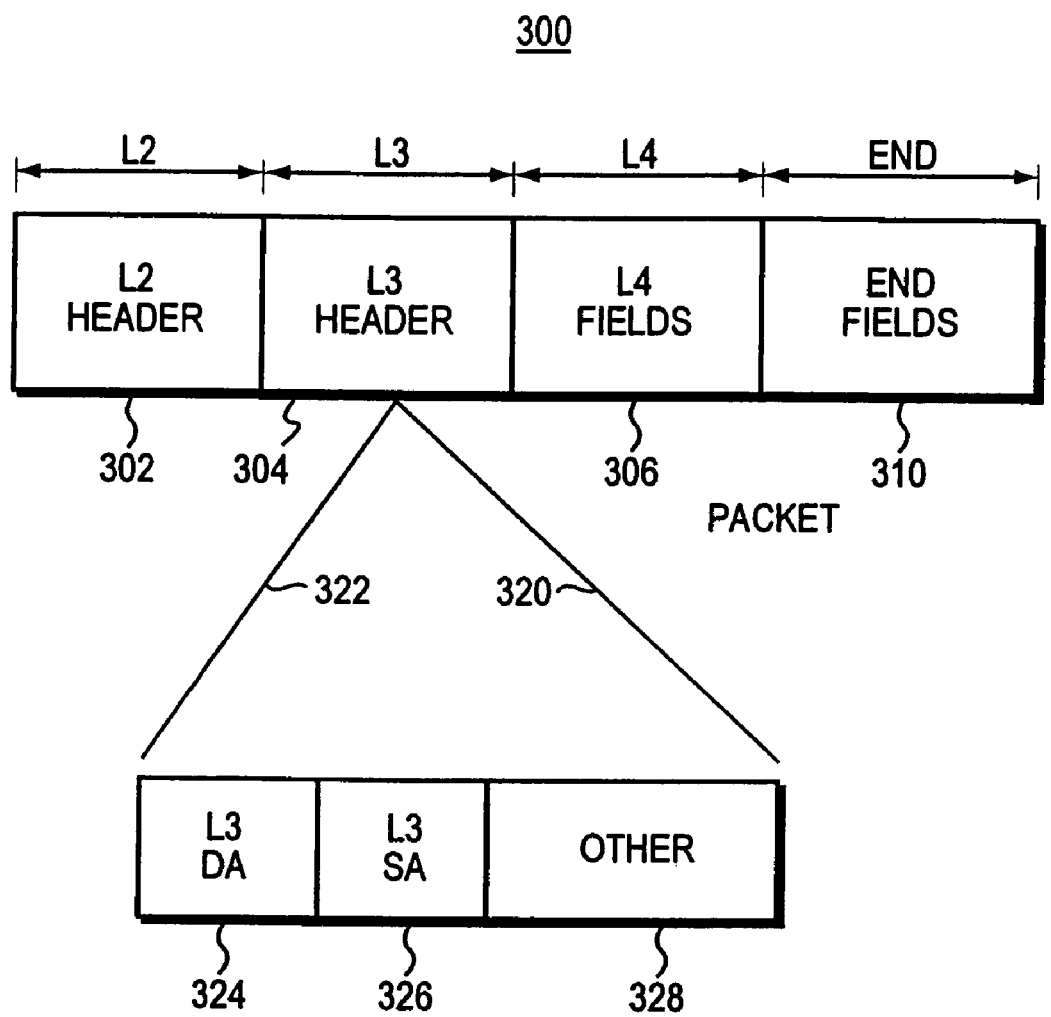
FIG. 3 is a field diagram of a data packet.

Turning now to FIG. 3, a fields of a typical data packet 300 are shown. The Layer 2 header 302 contains the Layer 2 fields required by the particular Layer 2 protocol utilized. The Layer 2-header fields always include a Layer 2 destination address and a Layer 2 source address. The Layer 2 destination address and Layer 2 source address are also referred to as the MAC destination address (MAC DA) and the MAC source address (MAC SA). The MAC destination address, for a multigroup packet, contains a value which has been assigned for multicast use.

MAC destination addresses used for IP multicast are in the range, in hexadecimal notation: 0100 5E00 0000; to 0100 5E7F FFFF.

The MAC source address of a packet is the address of the last layer 3 device transmitting the packet. For example, a packet transmitted by source end station 120 into network cloud 122 carries the MAC source address of end station 120. When the packet is reaches router 124, the MAC source address is that of the last router routing the packet. When router 124 routes the packet to router 110 the MAC source address is that of router 124, etc.

The Layer 3 header 304 contains the Layer 3 fields of the protocol utilized. For example, Layer 3 header fields may be the Internet protocol (IP) version 4 fields, or as another example the Layer 3 header fields 304 may be the IP version 6 header fields, etc. Layer 4 fields 306 contain a layer 4 header and the data fields. The end fields 310 contain fields such as the cyclic redundancy check field, etc.

As shown by breakout lines 320, 322, the Layer 3 Header 304 contains the Layer 3 Destination address field 324 (L3 DA), the Layer 3 Source Address field 326 (L3 SA), and other Layer 3 fields 328. For a multicast data packet, the source end station is determined by reading the Layer 3 Source Address field 326, and the multicast group number is determined by reading the Layer 3 Destination Address field 324.

Figure 4:
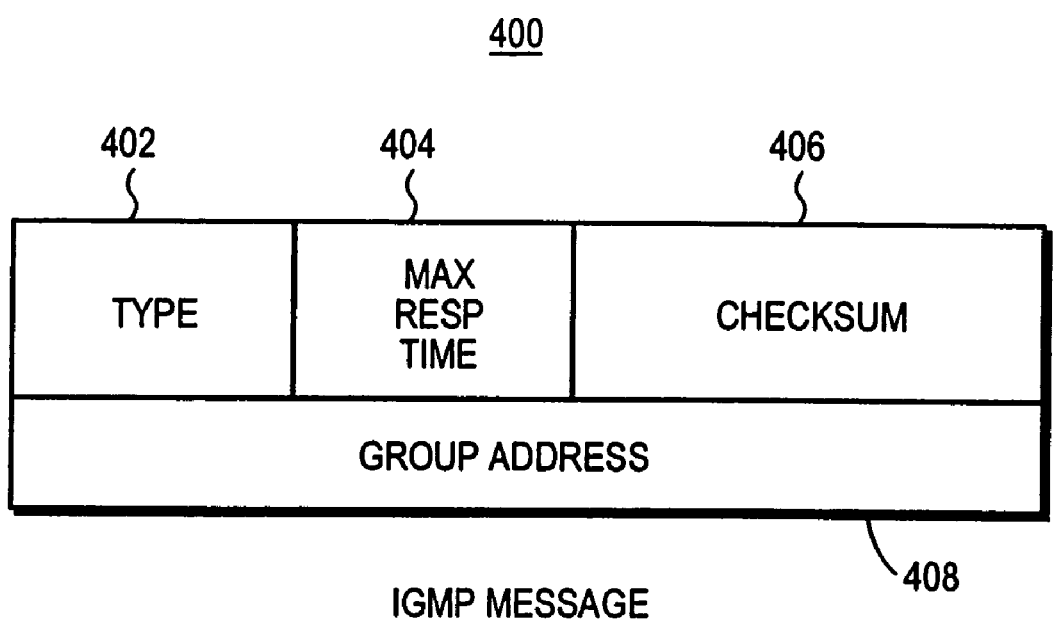
FIG. 4 is a block diagram of an IGMP message packet.

Turning now to FIG. 4, fields 400 of an Internet group management protocol (IGMP) packet as described in RFC 2236, are shown. Fields 400 are Layer 4 fields 306 of packet 300. Field 402 contains a type identifier. Field 404 contains a "maximum response time" field, and is used in accordance with the specifications, for example the specifications in the above mentioned RFC. Field 406 contains a checksum for determining the integrity of the data packet. Field 408 contains a group address. In RFC 1112 and RFC 2236, the group address is a 32-bit identifier for a particular multicast group.

The IGMP message was designed to carry to a router the group number which an end station wishes to receive, for the router to use in a PIM JOIN message which it transmits to other routers. The PIM JOIN message is used by the receiving routers to set up a multicast distribution tree for the group of multicast packets requested. The requesting router then becomes part of the multicast distribution tree for that group of multicast packets. A multicast distribution tree from a source station to all receiver stations can be constructed based upon IGMP JOIN messages and the corresponding PIM JOIN messages. Further, a multicast distribution tree may be torn down by use of IGMP LEAVE messages from receivers to routers, and PIM PRUNE messages transmitted by a router to other routers.

When a router intervenes between an end station and a layer 2 switch, the IGMP message does not reach the layer 2 switch. However, in the event that an end station is connected to a port of the layer 2 switch, the IGMP message enters the layer 2 switch. The IGMP message carries a multicast address in its MAC destination address, and the layer 2 switch forwards the IGMP message through all of its multicast ports. The routers then figure out what to do with the IGMP message. Additionally, some layer 2 switches are designed to implement a protocol known as "IGMP snooping", wherein the layer 2 switch reads the group number from the IGMP message. The layer 2 switch uses this group number to forward only those multicast group packets to the end station connected to the port of the layer 2 switch. No other groups of multicast packets are forwarded through the port connected to the end station. IGMP snooping is particularly useful in a layer 2 switch when it is used to switch packets to a plurality of end stations, for example, when the layer 2 switch is used in a wiring closet of a building.

Figure 5:
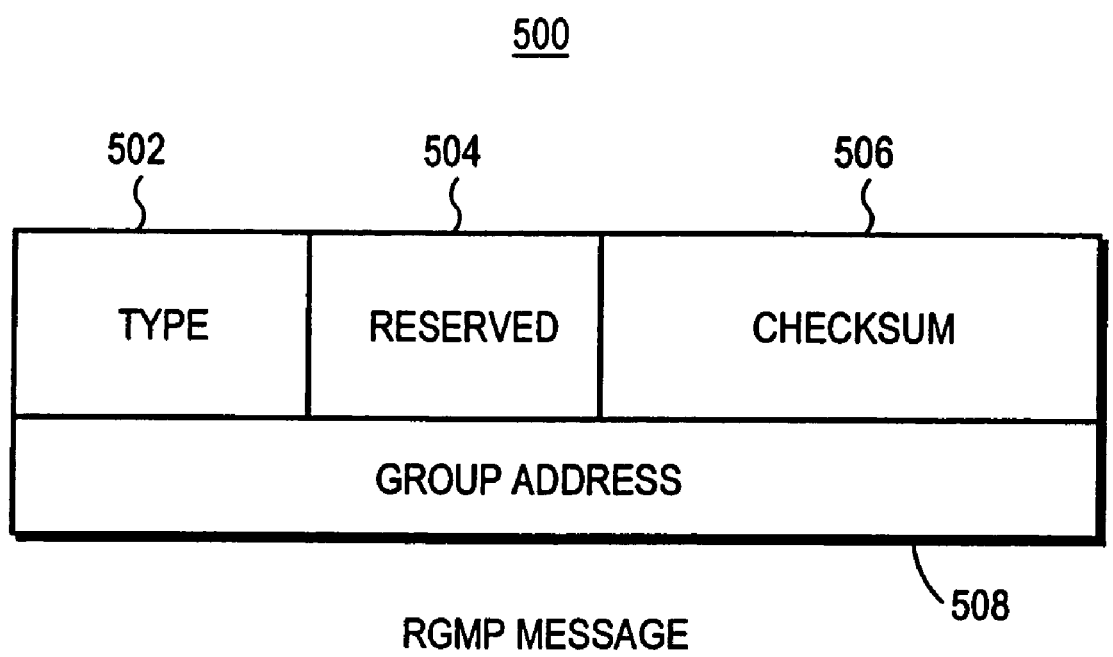
FIG. 5 is a block diagram of an RGMP message packet.

Turning now to FIG. 5, a router ports group management protocol (RGMP) message is shown. RGMP messages comprise HELLO messages to halt transmission of all multicast packets, JOIN messages to initiate transmission of multicast packets of a specified group, LEAVE messages to terminate transmission of packets of a specified group, and BYE messages to inactive the RGMP status of the router. After receipt of a BYE message, the Layer 2 switch begins transmitting all multicast packets to the router.

The protocol of the fields of the RGMP messages, as shown in FIG. 5, are substantially identical to the protocol of the IGMP message shown in FIG. 4. The difference is that "type" field 502 of the RGMP message has different values from the "type" field 402 used in IGMP messages. The Layer 2 switch 102 responds to the values in type field 502, and recognizes that the packet is an RGMP message.

Field 504 is reserved for future use. Field 506 is a checksum used to check the integrity of the RGMP message.

In the present invention, the IGMP protocol using PIM JOIN messages is used by a router to set up the multicast distribution tree. The end station transmits a IGMP JOIN message to a router, and the router transmits PIM JOIN messages to other routers. In the present invention, after the PIM JOIN has been used to set up a multicast distribution tree, the router sends the new inventive Router Group Multicast Protocol message (a RGMP message). In an exemplary embodiment of the invention, the RGMP message is addressed with the MAC SA and IP SA addresses of the sending router, a MAC DA multicast address, and an IP DA reserved address indicating a "router to switch communication".

In a preferred embodiment of the invention, the RGMP message is addressed as follows: The MAC SA and IP SA fields in the RGMP messages carry the MAC and IP addresses of the router where the messages are originated; the MAC DA field in RGMP messages is set to hex 0100.5E00.0019, a multicast layer 2 address; and, the IP DA field in RGMP messages is set to hex E0.0.0.19 (in decimal 224.0.0.25), a reserved address for "router to switch" communications.

In response to the multicast MAC DA a layer 2 switch multicasts the RGMP message to all ports connected to routers or other layer 2 switches.

A layer 2 switch, through which the RGMP message is forwarded, reads the RGMP message using IGMP snooping. The layer 2 switch then responds to information which it reads from the RGMP message.

In response to receiving and reading a RGMP HELLO message, the Layer 2 switch ceases to send multicast traffic to the router. When the router desires to receive multicast traffic from a particular group, the router sends a RGMP JOIN message containing the group number to a router. Any layer 2 switch through which the RGMP JOIN message passes reads the group field, again using IGMP snooping. In response to reading the fields of the RGMP JOIN message, the layer 2 switch then begins sending multicast traffic for that particular group to the router. Details of the RGMP protocol are further described hereinbelow.

The RGMP protocol is driven by the PIM protocol machinery. When a PIM HELLO is sent from a router to its neighboring PIM routers, an RGMP HELLO message is sent to the PIM routers in order to inform any intermediate layer 2 switches, if they exist, the RGMP capability of the transmitting router. In response to receiving the RGMP HELLO message, the layer 2 switch ceases to send all multicast traffic to the router. Instead, it only forwards multicast traffic to the port where an RGMP HELLO is seen if one of the following conditions is met:

1. If the MAC destination address of a packet corresponds to an IP address in the range of: 224.0.0.0 to; 224.0.0.255. These are reserved addresses and are supposed to be seen by all routers on a multi-access media.

2. If the MAC destination address corresponds to the IP address of either 224.0.1.39 or 224.0.1.40. These are reserved addresses for the Auto-RP functionality and are supposed to be seen by all multicast routers on a multi-access media.

3. If the MAC destination address matches an entry in the Forwarding Table. In this case, the entry in the forwarding table will also include a list of ports where RGMP HELLO and RGMP JOIN messages for the corresponding multicast group addresses were received. Multicast packets matching the conditions will then be forwarded to all of the matching ports.

RGMP HELLO messages are sent periodically in order to permit status of devices to change, and other devices to keep abreast of the changes. Likewise, PIM HELLO messages are sent periodically.

In the present invention, when a PIM JOIN message is sent from a router to a neighboring router to set up a segment of the multicast distribution tree for a group address, an RGMP JOIN message of the present invention is also sent to inform a layer 2 switch to add the port where the RGMP JOIN message is seen to the forwarding table in the layer 2 switch for the group address. The PIM JOIN message is meant to construct a segment of the multicast distribution tree between the sending router and the receiving router. The RGMP JOIN message is meant to set up the forwarding table in the layer 2 switches for more efficient multicast data forwarding.

In accordance with the prior art, for example, if a legacy router such as router 104, is received an IGMP JOIN message from a host end station connected thereto, then the router receiving the IGMP JOIN sends a PIM JOIN message to other multicast routers. The legacy router 104 does not send an RGMP HELLO message to the layer 2 switch, and so the layer 2 switch forwards all multicast group packets to the legacy routers.

Figure 6:
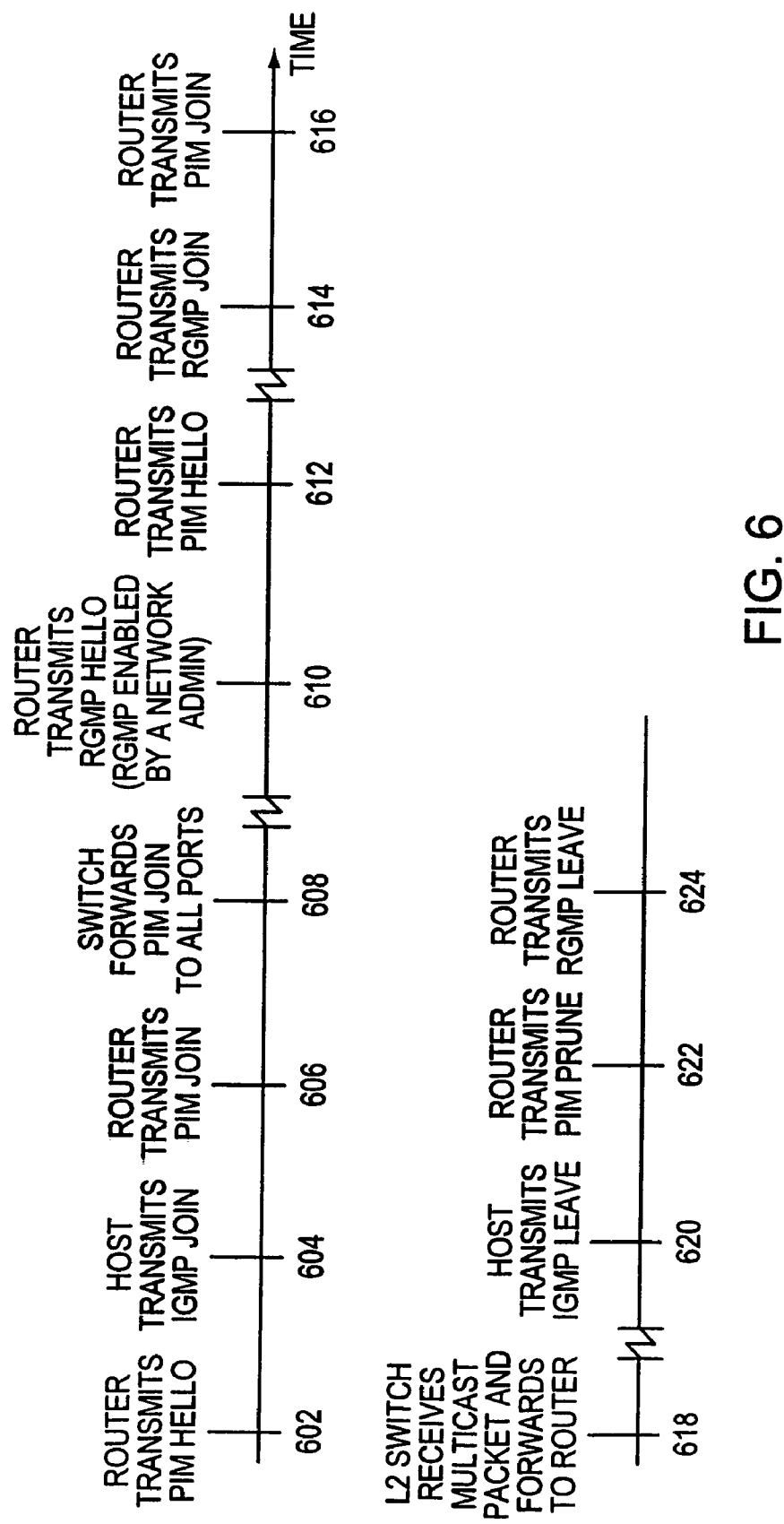
FIG. 6 is a timing diagram showing a router using RGMP messages to request multicast group packets from a Layer 2 switch.

Turning now to FIG. 6, a timeline describing a router, in accordance with the present invention, is shown. The timeline illustrates a router as it joins a multicast group transmission from a Layer 2 switch, such as Layer 2 switch 102 of FIG. 1.

At time 602 the router is enabled for multicast routing with the PIM protocol, so it transmits a PIM HELLO message for its PIM enabled neighbors to see.

At time 604 host computer 116 transmits an IGMP JOIN message specifying a particular multicast group "G1" to its local router, for example router 108.

At time 606 router 108 transmits a PIM JOIN message to router 110. The purpose of the PIM JOIN message is to construct a segment of the multicast distribution tree between router 108 and another router toward the source of the data.

At time 608 Layer 2 switch 102 replicates the PIM JOIN message and transmits it to all ports, since PIM JOIN is sent to 224.0.0.13.

At time 610 router 108 transmits an RGMP HELLO message to Layer 2 switch since RGMP is just enabled by a network administrator. Immediately thereafter, at time 612, router 108 transmits a periodically re-transmitted PIM HELLO to inform its PIM neighbors of its continued presence. In response to receiving the RGMP HELLO message from router 108, Layer 2 switch 102 ceases to transmit multicast packets to router 108.

At time 614, router 108 transmits an RGMP JOIN message specifying the desired group "G1", to the Layer 2 switch, in order to begin transmission by the Layer 2 switch of multicast packets of group G1.

Immediately thereafter, at time 616, router 108 re-transmits the PIM JOIN message to router 110.

At time 618 Layer 2 switch 102 receives a multicast packet of the group G1 requested by router 108 through its RGMP JOIN message.

In response to receiving the multicast packet of the desired group at time 618, Layer 2 switch 102 replicates and transmits the desired group packet to router r108, and to any other router which has requested packets of that group by transmitting a RGMP HELLO and RGMP JOIN message to Layer 2 switch 102.

At some later time, for example, time 620, host end station 116 transmits an IGMP LEAVE message to router 108. In response to receipt of that RGMP LEAVE message, router 108 transmits a PIM PRUNE message to router 110.

Immediately thereafter, router 108 sends an RGMP LEAVE message to Layer 2 switch 102. In response to receiving the RGMP LEAVE message, Layer 2 switch ceases to transmit packets of group G1 to router 108.

Turning now to FIG. 7, Table 700 indicates various RGMP packet types.

When type field 502 contains the value 0xFF the RGMP message is a "HELLO" message, as shown in entry 702. A HELLO message is transmitted by a router that has been enabled to practice the present invention, referred to hereinafter as an RGMP router, to have Layer 2 switch 102 add its designation to the switches forwarding table. The HELLO message is sent out when the RGMP feature is enabled on the router. HELLO packets have a 0.0.0.0. in the group address field of the RGMP packets. Thus the HELLO message does not request traffic from any group. Also, HELLO messages are sent periodically in order to maintain the Layer 2 switch 102 forwarding table in a current status.

When type field 502 contains the value 0xFE, the RGMP message is a "BYE" message. RGMP BYE messages are sent only when the router wishes to disable the RGMP feature. A BYE message has 0.0.0.0 in the group address field, and so does not apply to any specific group. Upon receipt of a BYE message, Layer 2 switch 102 then sends all multicast data traffic to the router, treating the router as a legacy router. All multicast data traffic is sent to the router because the router is known to be a multicast enabled router, however, the BYE message indicates that the RGMP feature is disabled on that router. These multicast data packets have 0.0.0.0 in the group address field.

When type field 502 contains the value 0xFD the RGMP message is a "JOIN" message for a specific multicast group G. The group "G" group address is contained in field 508. In response to receipt of the RGMP JOIN message, the Layer 2 switch 102 transmits multicast data traffic for the group G to the router transmitting the JOIN message.

When type field 502 contains the value 0xFC, the RGMP message is a "LEAVE" message. The RGMP LEAVE message contains the group address in the group address field 508. In response to receiving the RGMP LEAVE message the Layer 2 switch 102 ceases to send data traffic for Group "G" to the router transmitting the RGMP LEAVE message.

Turning now to FIG. 8, a table showing the addresses used in RGMP packets is shown. As shown in block 802, the destination MAC address in all RGMP packets is 01-00-5e-00-00-19. The destination IP address in all RGMP packets is shown in block 804 as 224.0.0.25.

As shown in block 806, the group address field in RGMP HELLO and BYE messages is 0.0.0.0. As shown in block 808, RGMP JOIN and LEAVE messages contain the group address for which the RGMP JOIN or LEAVE message is being sent, and the group address is carried in the group address field 508.

IGMP snooping is a feature introduced into routers by various manufacturers. At present, there is no well defined standard method for IGMP snooping.

IGMP snooping is the name for the process by which a Layer 2 switch reads higher layer fields of packets, rather than simply forward based upon the contents of Layer 2 fields. For example, when IGMP Snooping is activated, the Layer 2 switch reads the Layer 3 fields, and when the switch finds an IGMP packet, based on the values mentioned above for the MAC DA and the IP DA fields, the switch reads the Layer 4 fields. In reading the Layer 4 fields 306, the switch reads the fields 400 of the IGMP messages, and depending upon the value found in "type" field 402, reads the fields of RGMP messages 500. By reading the Group Address field 508 and the "Type" field 502, the Layer 2 switch determines whether the RGMP message is a HELLO, JOIN, BYE or LEAVE message, and the multicast group "G" to which the message applies.

RGMP Snooping permits the Layer 2 switch to detect the ports on which the multicast data traffic for a given group G needs to be sent. It also detects all the router ports to which the multicast group traffic must be sent by listening to various multicast routine protocol packets. Hence, RGMP Snooping is used to create an entry in the Layer 2 forwarding table of the Layer 2 switch 102, and is also used by the Layer 2 switch to learn the router ports to which the group traffic is to be transmitted.

RGMP Snooping ordinarily ages out source only entries in the Layer 2-switch forwarding table every few minutes, typically every five minutes. However the Layer 2 switch will not age out the RGMP Snooping entries because the RGMP enabled router transmits periodic RGMP HELLO messages.

Figure 9:
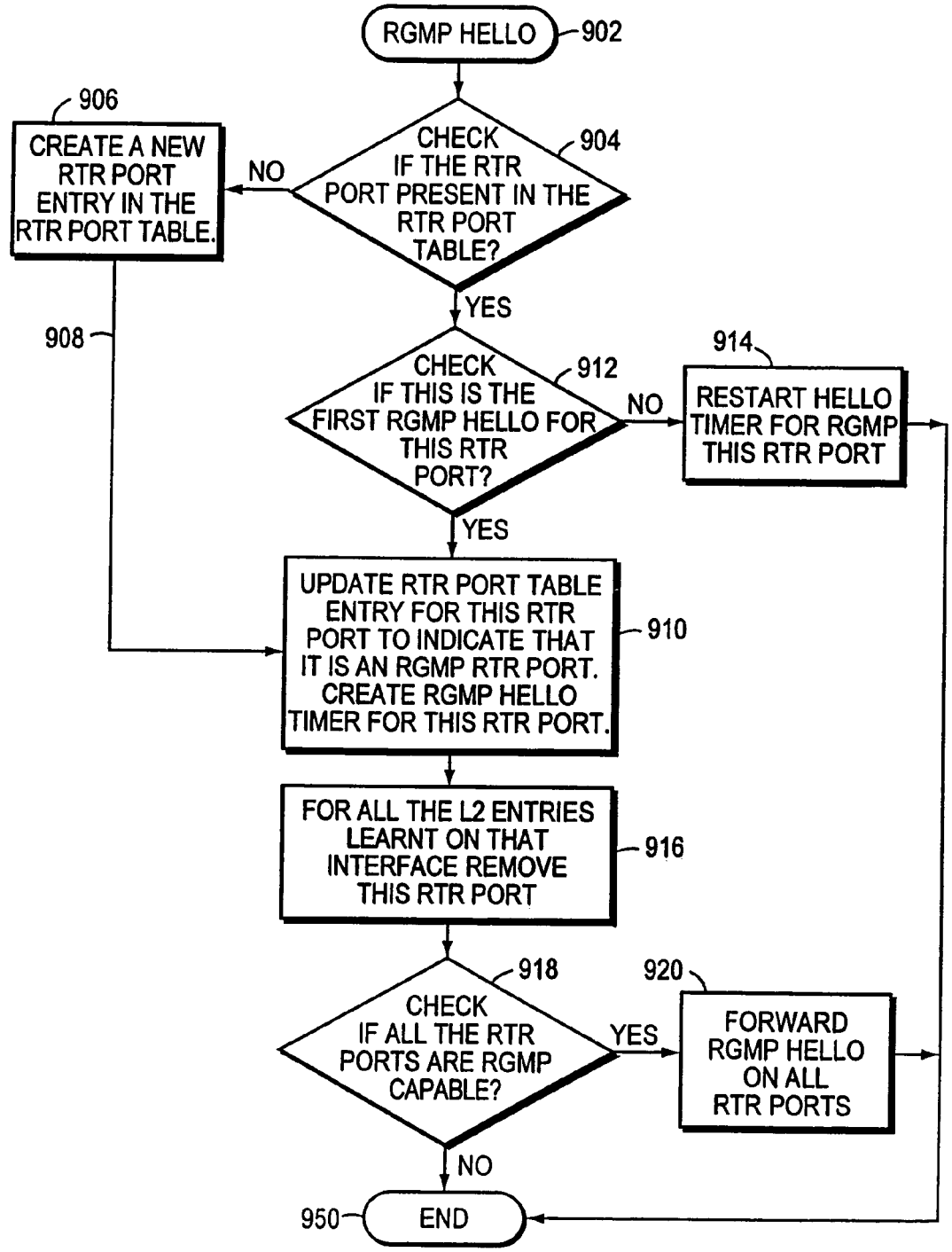
FIG. 9 is a flow chart showing processing of an RGMP HELLO message.

Turning now to FIG. 9, a flow chart showing processing of an RGMP HELLO message by a Layer 2 switch is shown. The RGMP HELLO message is received at block 902. The process goes to block 904 where a check is done to determine if the router port (RTR port) is present in the router port table.

If block 904 answers "No", the process goes to block 906 where a new router port entry is created in the router port table. From block 906 the process goes along path 908 to block 910.

If the test at block 904 answers "Yes", the router port is present in the table, the process goes to block 912. At block 912 a check is done to determine if this is the first RGMP HELLO message for this router port. In the event that the answer is yes, the process goes to block 910.

At block 910 the process updates the router port table entry for this router port to indicate that it is an RGMP port. Also at block 910 the process creates an RGMP Hello timer for this router port.

In the event that the answer at block 912 is "No", then the process goes to block 914. At block 914 the process starts the RGMP Hello timer for this port. From 914 the process goes to block 950 and ends.

Upon completion of block 910, the process goes to block 916. At block 916 the process removes all entries learned by the L2 switch on that interface for multicast transmission. After completion of block 916 the process goes to block 918.

At block 918 the process checks to determine if all of the router ports on this virtual local area network are RGMP capable. In the event that the check answers "Yes", the process goes to block 920. At block 920 the process forwards an RGMP Hello message on all ports on that virtual local area network. After completion of block 920, the process goes to 950 and ends.

In the event that the check in block 918 answers "No", the process goes to 950 and ends.

Figure 10:
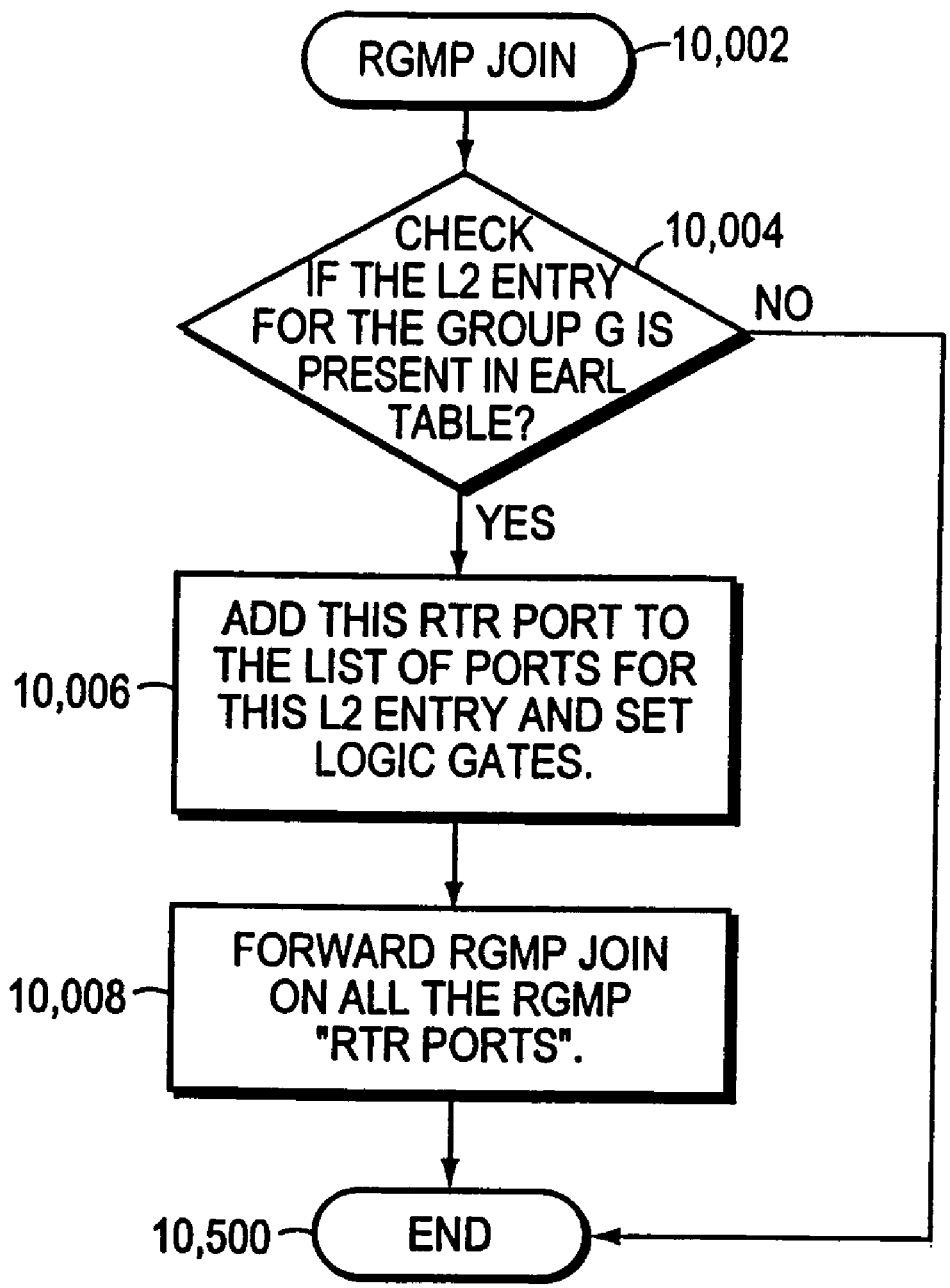
FIG. 10 is a flow chart showing L2 switch processing of an RGMP JOIN message.

Turning now to FIG. 10, a process by which an L2 switch processes an RGMP JOIN message received from a router is shown. At block 10,000 to the RGMP JOIN message is received. The process then goes to block 10,004.

At block 10,004 the process checks to determine if an L2 entry for the group G carried in the RGMP group address field 508 is present in the MAC Logic table. The MAC Logic table is a table used to make forwarding decisions based on the L2 MAC address.

In the event that the check answers "No", the process goes to block 10,500, and it ends. In the event that the answer in block 10,004 is "Yes", the process goes to block 10,006.

At block 10,006 the process adds this router port to the list of ports for this L2 entry. Logic gates are set to inform the line cards as to which ports should accept a given packet, and which ports should drop the packet. The logic gates resides in linecards 15,002-15,008, etc. In an exemplary embodiment of the invention, the logic gates are set by CPU control engine 15,030. Upon completion of block 10,006 the process goes to block 10,008.

At block 10,008 the process forwards RGMP JOIN messages on all the RGMP router ports. Upon completion of block 10,008, the process goes to block 10,500 and ends.

Figure 11:
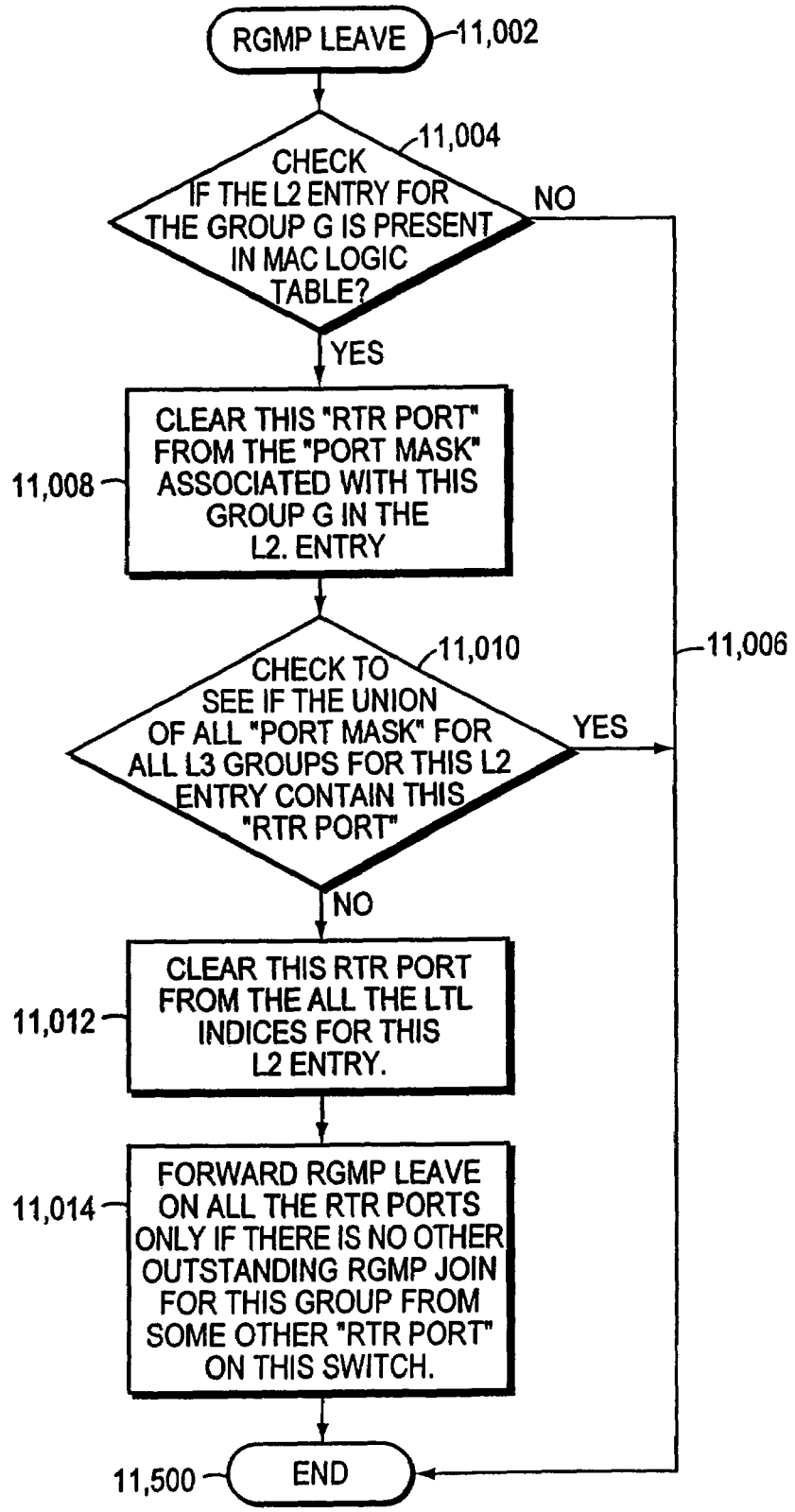
FIG. 11 is a flow chart showing L2 switch processing of an RGMP LEAVE message.

Turning now to FIG. 11, a process where an L2 switch process an RGMP LEAVE message is shown. At block 11,002 the RGMP LEAVE message is received. The process goes from block 11,002 to block 11,004. At block 11,004 a check is made to determine if the L2 entry for the group G is present in the MAC Logic table.

In the event that the test answers "No", the process goes on path 11,006 to block 11,500 where the process ends. In the event that the answer at block 11,004 is "Yes", the process goes to block 11,008.

At block 11,008 the process clears this RTR port entry from the "port masks" associated with this group G in the L2 entry. Upon completion of block 11,008, the process then goes to block 11,010.

At block 11,010 a check is done to see if the union of all port masks are all L3 groups for this L2 entry contain this RTR port. In the event that the answer is "Yes", the process goes to path 11,006 to block 11,500 where the process ends. In the event that the answer in block 11,010 is "No", the process goes to block 11,012.

At block 11,012 the process clears this RTR port from the all the logic gate entities for this L2 entry. Upon completion of block 11,012, the process goes to block 11,014.

At block 11,014 the process forwards an RGMP LEAVE on all the RTR ports, only if there is no other outstanding RGMP JOIN for this group from some other "RTR" port on this switch. Upon completion of block 11,004, the process goes to block 11,500 and ends.

Figure 12:
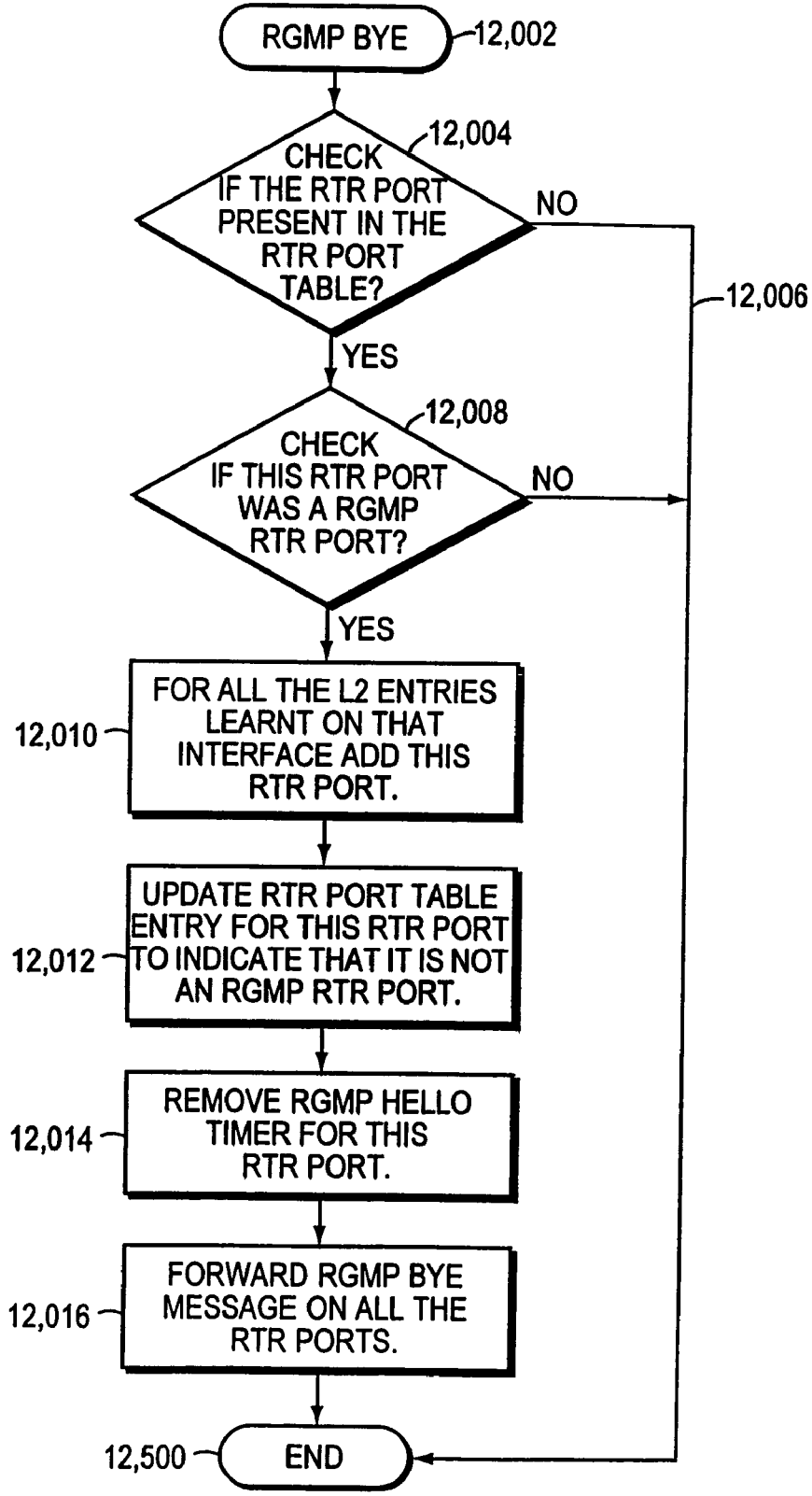
FIG. 12 is a flow chart showing L2 switch processing of an RGMP BYE message.

Turning now to FIG. 12, a process for an L2 switch processing an RGMP BYE message is shown. A ROMP BYE message is received at block 12,002. The process then goes to block 12,004. At block 12,004 a check is done to determine if the RTR port is present in the RTR port table. In the event that the answer is no, the process goes to path 12,006 to block 12,500 where the process ends.

In the event that the answer at block 12,004 is yes, the process goes to block 12,008.

At block 12,008 the process checks to determine if this RTR port was an RGMP RTR port. In the event that the question at block 12,008 is answered no, the process goes to path 12,006 where it goes to block 12,500 and the process ends. In the event that the answer at block 12,008 is yes, the process goes to block 12,010. At block 12,010 all of the L2 entries learned on that interface are added to this RTR report. The process then goes to block 12,012.

At block 12,012 the process updates the RTR port table entry for this RTR port to indicate that it is "not" an RGMP RTR port. Upon completion of block 12,012 the process goes to 12,014. At block 014 the process removes the RGMP Hello timer for this RTR port. Upon completion of block 12,014 the process goes to block 12,016.

At block 12,016 the process forwards an RGMP BYE message on all of the RTR ports. Upon completion of block 12,016 the process goes to block 12,500 where the process ends.

Figure 13:
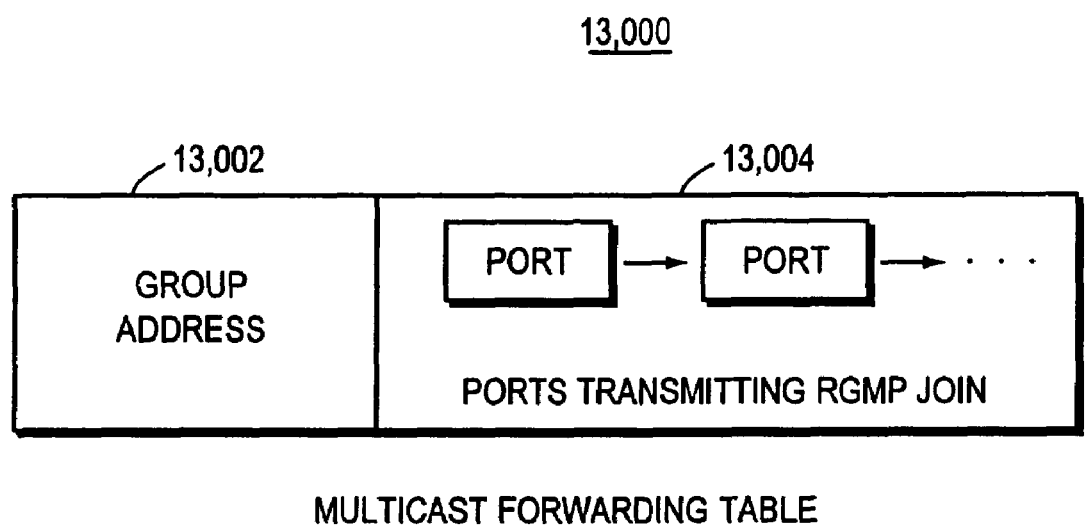
FIG. 13 is a multicast forwarding table showing entries in a Layer 2 switch implementing the invention.

Turning now to FIG. 13, an entry in the L2 switch multicast forwarding table 13,000 is shown. The group address is in entry 13,002. The linked list of ports to which a RGMP JOIN message has been received is in entry 13,004. When a data packet is received addressed to a multicast group, the group address is used as an entry into table 13,000, and is found in entry 13,002. The group address in field 13,002 points to the linked list of ports and entry 13,004. The multicast packet is then replicated and transmitted from each of the ports listed in field 13,004. The ports listed in field 13,004 is constructed by examining RGMP JOIN messages received requesting transmission of that group's data packets.

Turning now to FIG. 14, a prior art entry in the multicast forwarding of the L2 switch is shown. The group address is found in field 14,002. The entry in Field 14,002 points to a linked list of ports from which a transmission is to be made in Field 14,004. The entries in Field 14,004 include all ports of the L2 switch having group multicast enabled routers connected thereto. In contrast with the present invention, the Field 14,004 lists all ports having a multicast enabled router connected thereto, where in Table 13,000 only the ports requesting traffic from the particular group address are listed. Accordingly, the invention avoids the prior art structure of flooding router with unwanted multicast data packets.

Figure 15:
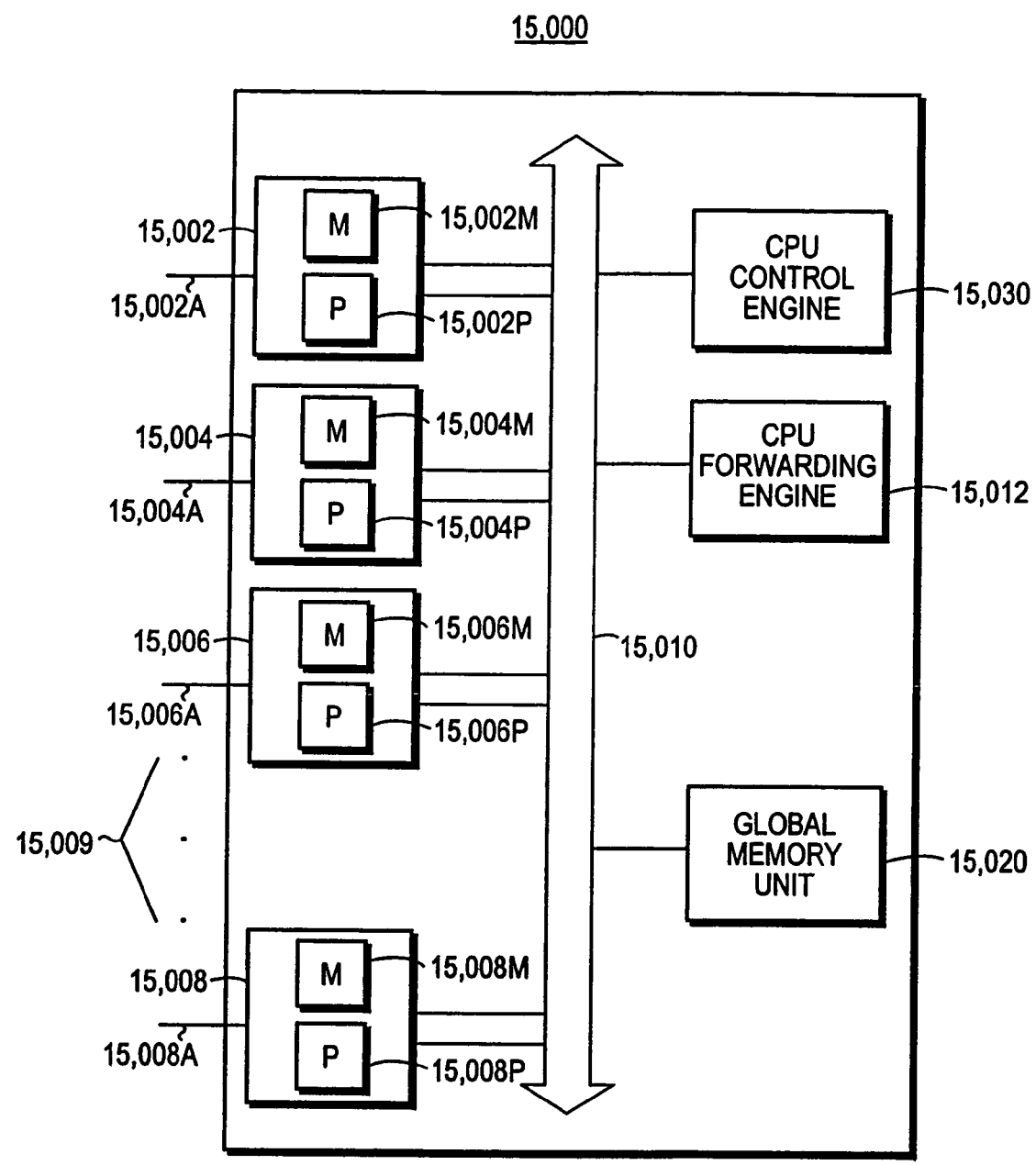
FIG. 15 is a block diagram of a network device.

Turning now to FIG. 15, a block diagram of a representative hardware structure for internal operation of a network device 15,000 is shown. The network device may be a layer 2 switch, or alternatively the network device may be a layer 3 router. When the network device functions as a layer 2 switch, the device switches in response to reading layer 2 fields. When the network device is a layer 2 switch employing IGMP snooping, the network device also reads layer 2 fields and layer 4 fields in making a switching decision. Further, when the network device is a layer 2 switch employing RGMP protocol as described hereinabove, the network device makes forwarding decisions in response to reading the type field 502 group address field 508 in RGMP JOIN and RGMP BYE messages.

When the network device 15,000 is a layer 3 switch, that is a router, it routes packets based upon reading the layer 3 fields of the packet.

Each linecard 15,002, 15,004, . . . 15,008 supports a port. For example, linecard 15,002 has port 15,002A; linecard 15,004 has port 15,004A; linecard 15,006 has port 15,006A, . . . and linecard 15,008 has port 15,008A, etc. Each linecard has a memory unit. For example, linecard 15,002 has memory unit 15,002M, linecard 15,004 has memory unit 15,004M, linecard 15,006 has memory unit 15,006M . . . and linecard 15,008 has memory unit 15,008M, etc. Each line card has a processor P, indicated by blocks 15,002P, 15,004P, 15,006P, . . . 15,008P, etc. The various linecards are interconnected by switch fabric 15,010. Switch fabric 15,010 may be, for example, a crossbar type switch fabric, an ATM based switch fabric, or may be simply a computer bus. A central processor unit forwarding engine 15,012 also attaches to switch fabric 15,010. In operation, a packet arrives at a port of a linecard and is transferred by switch fabric 15,010 to memory units in the required linecards. Ports 604, 606, 608, 610, 612, 614, 618, etc. are implemented on linecards 15,002, through 15,008 etc.

Further, CPU control engine 15,030 attaches to switch fabric 15,010. CPU control engine 15,030 is used to execute various control protocols for the network device. For example, CPU control engine 15,030 may be used to execute the Spanning Tree Protocol, the Link State Routing Protocol, the IGMP snooping protocol, RGMP protocol, etc. Execution of a process in a CPU is often referred to as "running" the process. Data read from various fields of a received packets are transferred to CPU control engine 15,030. Then CPU control engine exercises control of the network device through switch fabric 15,010, through control lines not shown in FIG. 15, etc. CPU control engine 15,030 may execute the software to implement the spanning tree protocol, and the process of the invention as illustrated in the flow charts of FIG. 9, FIG. 10, FIG. 11, and FIG. 12. Alternatively, the processes various protocols and the processes of the flow charts of FIG. 9, FIG. 10, FIG. 11, FIG. 12 may be executed, in whole or in part, in the processors on the linecards, processors 15,002P, through 15,008P, etc.

For example, in the event that a packet is received from an external connection at port 15,002A, the packet arrives at port 15,002A, is stored in memory unit 15,002M, and is simultaneously transmitted on switch fabric 15,010 to all of the other linecards, where the packet is stored in the memory unit of each of the other linecards. The memory 15,002M in the receiving linecard is necessary as a buffer in the event that switch fabric 15,010 is busy at the time that the packet arrives at port 15,002A. Processors 15,002P, 15,004P, 15,006P, . . . 15,008P, etc. on each linecard receive information from circuits on the linecard interpreting fields of the packets as the packet is being received.

In an exemplary embodiment of the invention, processors 15,002P, 15,004P, 15,006P, . . . 15,008P, etc. on the individual linecards act as forwarding engines and make decisions concerning the ports through which the packet is to be transmitted.

In an alternative exemplary embodiment of a network device, as the packet is being transferred on switch fabric 15,010 to all of the other linecards, fields of the packet are interpreted by circuitry in the receiving linecard, information is transferred to CPU forwarding engine 15,012, and CPU 15,012 makes decisions concerning which ports the packet is to be transmitted out through. Once CPU 15,012 makes a decision as to which ports the packet should be forwarded through, CPU 15,012 asserts control lines (not shown in FIG. 15) which grant permission to the appropriate linecards to transmit the packet out through that linecard's port.

In an alternative embodiment of the invention, a linecard may support a plurality of ports rather than only one port as is shown in FIG. 15. Three dots 15,009 indicate that a large number of linecards may be supported by the network device.

The exemplary internal architecture of a typical network device as shown in block diagram 15,000 permits line speed transfer of an incoming packet to one or more outgoing ports, simultaneously with receipt of the packet. Only a small delay is encountered, depending upon factors, for example, the state of switch fabric 15,010 as the packet is received at its incoming port, and the delay imposed by ordinary switch fabric transfer processes along switch fabric 15,010.

In an alternative exemplary design of a network device, a linecard may transfer an incoming packet to global memory unit 15,020. CPU 15,012 reads fields of the packet and decides which linecards must transmit the packet. After the packet is received into global memory 15,020, the packet is read by each linecard which must transmit the packet, and then the packet is transmitted by the linecards. In either event, the hardware reads the fields of the appropriate Layer, and responds by making the appropriate decision.

It is to be understood that the above-described embodiments are simply illustrative of the principles of the invention, and various other modifications and changes may be made by those skilled in the art which embody the principles of the invention and fall within the spirit and scope thereof.

What is claimed is:

1. A method for operating an upstream router transmitting multicast packets, comprising:
   receiving a HELLO message from a downstream router, said downstream router connected to a port of said upstream router, said HELLO message received from the downstream router at said port, and in response to said HELLO message halting transmission of multicast messages through said port by said upstream router;
   receiving through said port a JOIN message specifying a multicast group, and in response to said JOIN message transmitting multicast messages of said group through said port;
   receiving through said port a LEAVE message specifying said group, and in response to said LEAVE message halting transmission of multicast messages for said group through said port;
   receiving through said port a BYE message, and in response to said BYE message transmitting all multicast messages received by said upstream router through said port.

2. A method for operating a downstream router receiving multicast packets, comprising:
   transmitting a HELLO message out through a port connected to said upstream router in order to command said upstream router to stop forwarding multicast packets to said downstream router;
   transmitting a JOIN message specifying a multicast group out through said port in order to command said upstream router to forward multicast packets of said group to said downstream router;
   transmitting a LEAVE message specifying said group in order to command said upstream router to stop forwarding multicast packets of said group to said downstream router; and
   transmitting a BYE message to said upstream router in order to command said upstream router to begin forwarding all multicast packets to said downstream router.

3. The method as in claim 1 or claim 2, further comprising:
   indicating by a type number that said HELLO message is a multicast command message.

4. The method as in claim 1 or claim 2, further comprising:
   indicating by a type number of 0xFF that said HELLO message is a multicast command message.

5. The method as in claim 1 or claim 2, further comprising:
   indicating by a type number that said JOIN message is a multicast command message.

6. The method as in claim 1 or claim 2, further comprising:
   indicating by a type number of 0xFD that said JOIN message is a multicast command message.

7. The method as in claim 1 or claim 2, further comprising:
   indicating by a type number that said LEAVE message is a multicast command message.

8. The method as in claim 1 or claim 2, further comprising:
   indicating by a type number of 0xFC that said LEAVE message is a multicast command message.

9. The method as in claim 1 or claim 2, further comprising:
   indicating by a type number that said BYE message is a multicast command message.

10. The method as in claim 1 or claim 2, further comprising:
    indicating by a type number of 0xFE that said BYE message is a multicast command message.

11. The method as in claim 1 or claim 2, further comprising:
    using as said HELLO message a RGMP HELLO message;
    using as said JOIN message a RGMP JOIN message;
    using as said LEAVE message a RGMP LEAVE message; and
    using as said BYE message a RGMP BYE message.

12. An upstream router apparatus to transmit multicast packets, comprising:
    a linecard and first interpretative circuits to receive a HELLO message from a downstream router, said HELLO message received at a port of said upstream router from said downstream router connected to said port, and in response to said HELLO message halting transmission of multicast messages through said port;
    second interpretative circuits to receive through said port a JON message specifying a multicast group, and in response to said JOIN message transmitting multicast messages of said group through said port;
    third interpretative circuits to receive through said port a LEAVE message specifying said group, and in response to said LEAVE message halting transmission of multicast messages for said group through said port;
    fourth interpretative circuits to receive through said port a BYE message, and in response to said BYE message transmitting all multicast messages received by said upstream router through said port.

13. A downstream router apparatus to receive multicast packets, comprising
    a linecard and first circuits to transmit a HELLO message out through a port connected to an upstream router in order to command said upstream router to stop forwarding multicast packets to said downstream router;
    second circuits to transmit a JOIN message specifying a multicast group out through said port in order to command said upstream router to forward multicast packets of said group to said downstream router;

third circuits to transmit a LEAVE message specifying said group in order to command said upstream router to stop forwarding multicast packets of said group to said downstream router;

fourth circuits to transmit a BYE message to said upstream router in order to command said upstream router to begin forwarding all multicast packets to said downstream router.

14. The apparatus as in claim 12 or claim 13, further comprising:
a type number to indicate that said HELLO message is a multicast command message.

15. The apparatus as in claim 12 or claim 13, further comprising:
a type number of 0xFF to indicate that said HELLO message is a multicast command message.

16. The apparatus as in claim 12 or claim 13, further comprising:
a type number to indicate that said JOIN message is a multicast command message.

17. The apparatus as in claim 12 or claim 13, further comprising:
a type number of 0xFD to indicate that said JOIN message is a multicast command message.

18. The apparatus as in claim 12 or claim 13, further comprising:
a type number to indicate that said LEAVE message is a multicast command message.

19. The apparatus as in claim 12 or claim 13, further comprising:
a type number of 0xFC to indicate that said LEAVE message is a multicast command message.

20. The apparatus as in claim 12 or claim 13, further comprising:
a type number to indicate that said BYE message is a multicast command message.

21. The apparatus as in claim 12 or claim 13, further comprising:
a type number of 0xFE to indicate that said BYE message is a multicast command message.

22. The apparatus as in claim 12 or claim 13, further comprising:
said HELLO message is a RGMP HELLO message;
said JOIN message is a RGMP JOIN message;
said LEAVE message is a RGMP LEAVE message; and
said BYE message is a RGMP BYE message.

23. An upstream router apparatus to transmit multicast packets, comprising:
means for receiving a HELLO message from a downstream router, said downstream router connected to a port of said upstream router, said HELLO message received from the downstream router at said port, and in response to said HELLO message halting transmission of multicast messages through said port by said upstream router;
means for receiving through said port a JOIN message specifying a multicast group, and in response to said JOIN message transmitting multicast messages of said group through said port;
means for receiving through said port a LEAVE message specifying said group, and in response to said LEAVE message halting transmission of multicast messages for said group through said port;
means for receiving through said port a BYE message, and in response to said BYE message transmitting all multicast messages received by said upstream router through said port.

24. A downstream router apparatus to receive multicast packets, comprising:
means for transmitting a HELLO message out through a port connected to said upstream router in order to command said upstream router to stop forwarding multicast packets to said downstream router;
means for transmitting a JOIN message specifying a multicast group out through said port in order to command said upstream router to forward multicast packets of said group to said downstream router;
means for transmitting a LEAVE message specifying said group in order to command said upstream router to stop forwarding multicast packets of said group to said downstream router; and
means for transmitting a BYE message to said upstream router in order to command said upstream router to begin forwarding all multicast packets to said downstream router.

25. The apparatus as in claim 23 or claim 24, further comprising:
means for indicating by a type number that said HELLO message is a multicast command message.

26. The apparatus as in claim 23 or claim 24, further comprising:
means for indicating by a type number of 0xFF that said HELLO message is a multicast command message.

27. The apparatus as in claim 23 or claim 24, further comprising:
means for indicating by a type number that said JOIN message is a multicast command message.

28. The apparatus as in claim 23 or claim 24, further comprising:
means for indicating by a type number of 0xFD that said JOIN message is a multicast command message.

29. The apparatus as in claim 23 or claim 24, further comprising:
means for indicating by a type number that said LEAVE message is a multicast command message.

30. The apparatus as in claim 23 or claim 24, further comprising:
means for indicating by a type number of 0xFC that said LEAVE message is a multicast command message.

31. The apparatus as in claim 23 or claim 24, further comprising:
means for indicating by a type number that said BYE message is a multicast command message.

32. The apparatus as in claim 23 or claim 24, further comprising:
means for indicating by a type number of 0xFE that said BYE message is a multicast command message.

33. The apparatus as in claim 23 or claim 24, further comprising:
means for using as said HELLO message a RGMP HELLO message;
means for using as said JOIN message a RGMP JOIN message;
means for using as said LEAVE message a RGMP LEAVE message; and
means for using as said BYE message a RGMP BYE message.

34. A computer readable media, comprising:
said computer readable media containing instructions for execution on a processor for the practice of a method of operating an upstream router transmitting multicast packets, the method having the steps,
receiving a HELLO message from a downstream router, said downstream router connected to a port of said upstream router, said HELLO message received from the downstream router at said port, and in response to said HELLO message halting transmission of multicast messages through said port by said upstream router;

receiving through said port a JOIN message specifying a multicast group, and in response to said JOIN message transmitting multicast messages of said group through said port;

receiving through said port a LEAVE message specifying said group, and in response to said LEAVE message halting transmission of multicast messages for said group through said port;

receiving through said port a BYE message, and in response to said BYE message transmitting all multicast messages received by said upstream router through said port.

35. A computer readable media, comprising:

said computer readable media containing instructions for execution on a processor for the practice of a method of operating a downstream router receiving multicast packets, the method having the steps, transmitting a HELLO message out through a port connected to said upstream router in order to command said upstream router to stop forwarding multicast packets to said downstream router;

transmitting a JOIN message specifying a multicast group out through said port in order to command said upstream router to forward multicast packets of said group to said downstream router;

transmitting a LEAVE message specifying said group in order to command said upstream router to stop forwarding multicast packets of said group to said downstream router; and transmitting a BYE message to said upstream router in order to command said upstream router to begin forwarding all multicast packets to said downstream router.

* * * * *

UNITED STATES PATENT AND TRADEMARK OFFICE
CERTIFICATE OF CORRECTION

PATENT NO. : 7,385,977 B2
APPLICATION NO. : 10/939100
DATED : June 10, 2008
INVENTOR(S) : Ishan Wu It is certified that error appears in the above-identified patent and that said Letters Patent is hereby corrected as shown below:

Col. 5, Line 3, please amend as shown:

120. When the packet[[ is]] reaches router 124, the MAC source

Col. 7, Line 34, please amend as shown:

router such as router 104,[[ is]] received an IGMP JOIN

Col. 10, Line 62, please amend as shown:

processing an RGMP BYE message is shown. A[[ ROMP]] RGMP

Col. 14, Line 47, please amend as shown:

a[[ JON]] JOIN message specifying a multicast group, and in

Signed and Sealed this

Ninth Day of November, 2010

David J. Kappos
*Director of the United States Patent and Trademark Office*